3,314,924
POLYMERIZATION OF N-SULFONYLAZIRIDINES
Morton H. Litt and Taghi G. Bassiri, Morristown, N.J., assignors to Allied Chemical Corporation, New York, N.Y., a corporation of New York
No Drawing. Filed Oct. 22, 1963, Ser. No. 318,092
13 Claims. (Cl. 260—79.3)

This invention relates to a process for the polymerization of N-sulfonylaziridines and to a process for obtaining higher molecular weight polymers of the same.

The polymerization of N-sulfonylaziridines proceeds in the absence of a catalyst either at room temperature or by the application of heat. The products made by polymerization in the presence of alkaline catalysts as described in U.S.P. 2,269,997 appear to be interpolymers in which the organic base serves not only as catalyst but enters into the polymer structure giving products with physical properties, particularly solubilities, quite different from the polymers of the imines alone.

We have discovered that contrary to the suggestion in the above U.S. patent that acids retard polymerization of these N-sulfonylaziridines that polymerization of N-sulfonylaziridines having the formula:

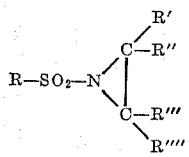

wherein R is a radical selected from the group consisting of alkyl, aryl, alkylaryl, cycloalkyl and aralkyl and R', R'', R''', and R'''' are members independently selected from the group consisting of hydrogen, alkyl, aryl, aralkyl and alkylaryl radicals with at least two of said members being hydrogen can be accelerated with the use of certain Lewis acids, namely, those Lewis acids which can be classified as inorganic halide Friedel-Crafts reaction catalysts. In particular, we have discovered that the time required for polymerization of these monomers can be drastically and substantially reduced by employing a Friedel-Crafts catalyst such as $AlCl_3$, $FeCl_3$, $SnCl_4$, $BF_3$, $ZnCl_2$, $BeCl_2$, $TiCl_4$, $ZrCl_4$, $HfCl_4$, $ThCl_4$, $NbCl_5$ or $TaCl_5$. In performing the process of our invention, an N-sulfonylaziridine monomer is heated in liquid state together with an inorganic halide Friedel-Crafts reaction catalyst. For reasons which will appear hereinafter, we prefer to employ a ratio of N-sulfonylaziridine monomer to catalyst of between about 200:1 and 10,000:1 and to maintain the temperature of the reaction at less than 200° C. The resultant polymer is characterized by a relatively high molecular weight as measured by its viscosity. The polymers so obtained are of sufficiently high molecular weight as to lend themselves to the formation of fibers and films. The above ratios are ratios by weight.

The high molecular weight polymers of these N-sulfonylethylaziridines contain a plurality of units of the type

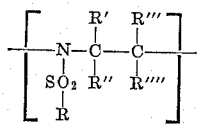

wherein R, R', R'', R''', and R'''' have the previously assigned significance. It is theorized that when the monomer is heated in its liquid state that the nitrogen to carbon bond breaks and formation of the polymer occurs by the opening of the imine ring. The substituents within the scope of the above given monomer formula do not interfere with this polymer formation and the same procedures may be used to polymerize all of the monomers suitable for practicing the present invention.

These N-sulfonylethyleneimines can be polymerized by heating the monomer in its liquid state. In the polymerization the monomer is heated until it melts and the temperature of the reaction mixture is maintained between the melting point of the monomer and about 200° C. If the reaction mixture is heated above 200° C., the polymer so obtained will, in many instances, be so charred and degraded that it will not be suitable for any commercial application. We prefer to keep the temperature of the reaction mixture below 100° C. for most N-sulfonylaziridines. At these temperatures, excellent high molecular weight polymer is obtained in a short period of time due to the accelerating effect of the inorganic halide Friedel-Crafts reaction catalysts. On the other hand, we prefer the reaction temperatures to be above 70° C. since at temperatures less than 70° C. considerable time may be required for extensive polymerization even in the presence of the catalyst-accelerators used in the process of our invention, notwithstanding that solid polymer forms after a short time of heating at temperatures between 60 and 70° C.

In carrying out the process of this invention it is preferred that the reaction be performed in an inert atmosphere or vacuum, since this will prevent any possible deleterious effects which water or air could have upon the reaction or the resultant polymer. We also prefer to use a monomer to catalyst ratio of between about 200:1 and 10,000:1 in operation of our process. Since the molecular weight of the polymer obtained increases with an increasing monomer to catalyst ratio when too much catalyst is used i.e. an amount in excess of the 200:1 ratio to the molecular weight of the polymer will be too low while if too little catalyst is used say below the 10,000:1 ratio the molecular weight will tend to be too high giving a product which is difficult to handle. The above ratios are ratios by weight.

We have further discovered that the molecular weight of the resultant N-sulfonylarizidine polymer increases as the degree of purity of the monomer employed increases. In particular, we have discovered that an N-sulfonylaziridine which has been purified to substantially constant melting point will, upon polymerization, provide a polymer with a substantially higher molecular weight, whether or not the polymerization is performed in accordance with the above procedure, i.e. use of an inorganic halide Friedel-Crafts reaction catalyst. Thus, an N-sulfonylaziridine which has not been purified to the extent that further purification will have little or no effect on its melting point will polymerize rapidly according to the above procedure. Yet, the polymer so obtained will not have as high a molecular weight as obtained from a monomer which has been extensively purified, say, by repeated recrystallization from a suitable solvent such as ether. For example, we can polymerize thrice recrystallized N-(p-toluene sulfonyl) aziridine and obtain therefrom the corresponding polymer having a reduced viscosity, measured in 1% solution in aqueous 95% sulfuric acid at 25° C. of at least about 0.8 and melting at about 295–305° C. and capable of forming fibers from the melt. In this regard, we have found that the molecular weight (as measured by reduced viscosity) of an N-sulfonylaziridine polymer, the monomer of which has been thrice recrystallized, is far greater than the molecular weight of the same polymer obtained from a monomer only once recrystallized.

In line with the above, it will be appreciated that the method for increasing the molecular weight of N-sulfonylaziridine polymers is not dependent upon any particular method for purifying the monomer. Other known methods, such as fractional distillation, are similarly suitable and, in some circumstances, will be preferred. For example, once recrystallized p-toluene sulfonylaziridine having a melting point of 64–65° C. polymerizes only slowly when heated at 65° C. to a low molecular weight polymer, whereas a monomer which has been thrice recrystallized with melting point of 66° C. polymerizes readily under the conditions of our process at its melting point temperature to a polymer of high molecular weight.

This discovery enables N-sulfonylaziridine monomers which do not readily polymerize to polymerize easily. In particular, we have discovered that N-(n-butane sulfonyl)-aziridine prepared by crystallization from ether and vacuum drying did not polymerize on heating as do most N-sulfonylaziridine monomers. However, by purifying the monomer so that its boiling point was 102–104° C. (under 3–4 mm. pressure) we obtained a polymer, the polymerization proceeding, however, slowly in the absence of catalyst. When this monomer was polymerized in the presence of ferric chloride, the polymerization proceeded quickly, and was almost instantaneous in the presence of boron trifluoride.

In order to more fully illustrate the nature of our invention and the manner of practicing the same, the following examples are presented. In the examples the viscosities were measured as 1% solutions of the polymers in 95% sulfuric acid at 25° C.

EXAMPLE 1

Thrice recrystallized N-(p-toluene sulfonyl)-aziridine with a melting point of 66° C. was heated at 60–65° C. for 26 hours and then at 100° C. for 114 hours. The polymer so obtained had a substantially higher viscosity than that obtained using once recrystallized monomer. The latter, which was prepared by heating the monomer at about its melting point, i.e. 64–65° C., for 6 hours and further at 100° C. for 24 hours, had a melting point of 300° C. and a reduced viscosity of 0.45 (1% solution in 95% sulfuric acid). The thrice recrystallized monomer gave a polymer having a melting point of 300° C. and a reduced viscosity of 0.81. From this high molecular weight polymer a fiber was drawn from the melt which retained its fiber shape upon solidification.

EXAMPLE 2

To N-(p-toluene sulfonyl)-aziridine with melting point of 66° C. was added 0.01% its weight of anhydrous ferric chloride (dissolved in a small quantity of ethyl ether). The mixture was heated in a vacuum at 70° C. for 24 hours, further at 80° C. for 72 hours, and still further at 100° C. for 41 hours. The polymerized product had a reduced viscosity of 1.70, indicating a much higher molecular weight polymer than the products of the above example.

EXAMPLE 3

*Part A.*—N-(methane sulfonyl)-aziridine with a melting point of 27–28° C., which had been crystallized from ether, was heated in a vacuum at 70° C. for 3 hours and further at 100° C. for 72 hours. The solid product was soluble in 95% sulfuric acid and trichloro acetic acid and was insoluble in trifluoro acetic acid, nitro methane and formic acid. Its 1% solution in 95% sulfuric acid had a reduced viscosity of 0.27.

*Part B.*—A mixture of once distilled N-(methane sulfonyl)-aziridine with melting point of 27–28° C. was heated in a vacuum with 0.01% of its weight of the hexahydrate of ferric chloride (dissolved in a small quantity of methanol) for 72 hours at 100° C. The resultant product had a reduced viscosity of 0.50. It decomposed when heated in air at around 300° C. This example in part B v. part A illustrates that the Friedel-Crafts catalyst employed in the process of the instant invention not only accelerates the polymerization of N-sulfonylaziridine monomer but yields substantially higher molecular weight polymers as indicated by substantially higher reduced viscosity.

EXAMPLE 4

Crude, vacuum-dried N-(n-butane sulfonyl)-aziridine was heated at 100° C. for 24 hours. No change was apparent. The monomer was fractionally distilled under reduced pressure and portions of the fraction with a boiling range of 102–104° C. at 3–4 mm. pressure were treated as follows: The monomer was heated in a vacuum without catalyst at a temperature of 100° C. Solid appeared at 400 minutes of heating at that temperature. The same monomer was placed in a vessel together with 0.1% of its weight of boron trifluoride etherate. Solid appeared immediately at room temperature.

This example is a comparative example illustrating the substantial polymerization accelerating effect accomplished by use of the inorganic halide Friedel-Crafts reaction catalyst employed in the process of our invention.

It is readily seen therefore, that the process of the instant invention provides an excellent process for polymerizing N-sulfonylaziridines in a short period of time. It will also be appreciated that the process of our invention whereby purified N-sulfonylaziridine monomers are employed provides higher molecular weight polymers than are readily available by processes heretofore known. These higher molecular weight N-sulfonylaziridine polymers have a greater degree of commercial utility and make the process of this invention, while in retrospect relatively simple, a valuable contribution to the art of polymerization of N-sulfonylaziridines.

It is to be realized that certain modifications and departures from the above disclosure will be obvious to those skilled in the art, as the above disclosure is merely illustrative of the invention and not to be construed as limitative of the same. Accordingly, this invention should be construed only in the light of the spirit and scope of the appended claims.

We claim:
1. The process for the polymerization of an N-sulfonylaziridine having the structure:

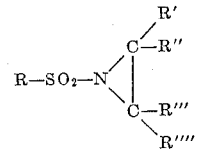

wherein R is selected from the group consisting of alkyl, aryl, alkylaryl, aralkyl and cycloalkyl; and R', R'', R''' and R'''' are members independently selected from the group consisting of hydrogen, alkyl, aryl, aralkyl and alkylaryl with at least two of said members being hydrogen, which comprises heating said N-sulfonylaziridine in its liquid state in the presence of an inorganic halide Friedel-Crafts reaction catalyst.

2. The process according to claim 1 wherein said N-sulfonylaziridine is purified to a substantially constant melting point prior to polymerization in order to obtain therefrom a polymer having a greater inherent viscosity.

3. The process according to claim 1 wherein said catalyst is selected from the group consisting of $AlCl_3$, $FeCl_3$, $SnCl_4$, $BF_3$, $ZnCl_2$, $BeCl_2$, $TiCl_4$, $ZrCl_4$, $HfCl_4$, $ThCl_4$, $NbCl_5$ and $TaCl_5$.

4. The process according to claim 1 wherein said N-sulfonylaziridine is heated in order to melt said N-sulfonylaziridine and heating is continued at temperatures in excess of its melting point.

5. The process according to claim 1 wherein a N-sulfonylaziridine to catalyst ratio by weight of between about 200:1 and 10,000:1 is employed.

6. The process according to claim 1 wherein said N-sulfonylaziridine is heated at temperature between 70 and 100° C. in a vacuum.

7. The process according to claim 1 wherein said N-sulfonylaziridine is N-(methane sulfonyl)-aziridine.

8. The process according to claim 1 wherein said N-sulfonylaziridine is N-(p-toluene sulfonyl)-aziridine.

9. The process according to claim 1 wherein said N-sulfonylaziridine is N-(n-butane sulfonyl)-aziridine.

10. The process according to claim 1 wherein said Friedel-Crafts catalyst is boron trifluoride etherate.

11. The process according to claim 1 wherein said Friedel-Crafts catalyst is $FeCl_3$.

12. The process according to claim 1 wherein said N-sulfonylaziridine is heated at temperatures not in excess of 200° C.

13. A process according to claim 1 wherein the N-sulfonylaziridine monomer utilized is purified to substantially constant melting point.

References Cited by the Examiner

UNITED STATES PATENTS 2,269,997   1/1942   Berchet _____ 260—79.3

JOSEPH L. SCHOFER, *Primary Examiner.*

D. K. DENENBERG, *Assistant Examiner.*